INVENTORS
René Molinier
Robert Syre
by McDougall, Hersh & Scott
Att'ys

1

3,302,443
METHOD FOR PRODUCING HOLLOW BERYLLIUM PRODUCTS BY EXTRUSION OR DRAWING
Robert Syre, Rue Arago, Cognin, France, and Rene Molinier, 29 Blvd. Gambetta, Chambery, France
Filed July 3, 1964, Ser. No. 400,294
Claims priority, application France, July 3, 1963, 940,272
19 Claims. (Cl. 72—367)

This invention relates to the fabrication of hollow articles of beryllium by the processes of drawing or extrusion.

Metallic beryllium has a number of characteristics which militate against its being processed by drawing or extrusion. Two of the disadvantages of a serious nature include partial or complete breakage of the die during such drawing or extrusion operation due possibly to the hardness or stiffness of the beryyium and the other disadvantage gives rise to surface roughness and cracks upon issuance of the beryllium from the draw or extrusion die.

To the present, shaped and hollow articles have been formed of beryllium by the techniques of powered metallurgy to form a block of beryllium by compression and sintering after which the compressed block is machined to the desired shape or hollow article. This process is time consuming and costly by reason of waste of considerable amounts of the expensive metal removed by machining and the special precautions required during machining for protection of the operator and it fails to produce beryllium products having optimum mechanical properties.

Attempts have been made to form products by extrusion of beryllium by interposing between the beryllium metal and the die a very thin layer of a highly ductile metal, such as gold or silver or a sheath of metal having good mechanical strength and sufficient ductility. Such modification enables direct processing of the beryllium by drawing or extrusion but only for reduction ratios which seldom would exceed 5, although ratios up to 15 have been achieved under very special conditions. The surface characteristics are not always satisfactory and the formation of cracks cannot always be avoided.

It is an object of this invention to produce and to provide a method for producing hollow articles of beryllium by the process of drawing or extrusion and it is a related object to provide a process of the type described which produces a beryllium product having good surface finish and which enjoys relative freedom from cracks and surface roughness; which is not destructive to the draw or extrusion die; which affords good dimensional control of the final drawn or extruded beryllium product; and which is capable of high reduction ratios in excess of 15.

These and other objects and advantages of this invention will hereinafter appear and for purposes of illustration, but not of limitation, embodiments of the invention are shown in the accompanying drawing, in which—

Figure 1:
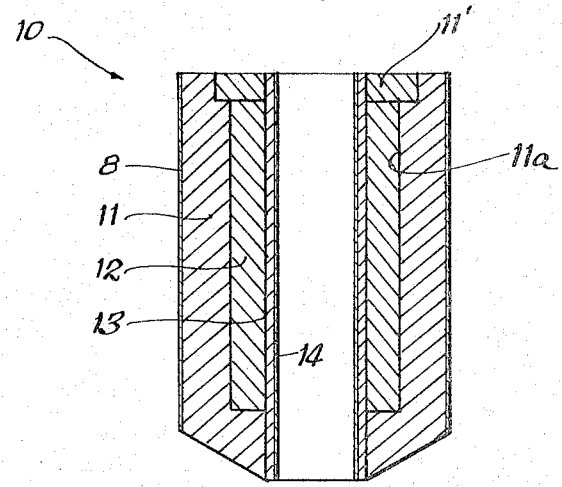
Figure 2:
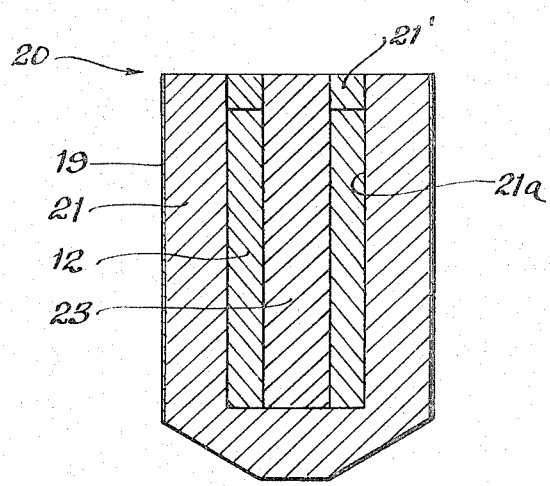

FIG. 1 is a schematic sectional elevational view of one type of billet employed in the practice of this invention for the fabrication of hollow beryllium articles by drawing over a rod or mandrel, and FIG. 2 is a sectional elevational view of a modification in the billet for use in the fabrication of hollow articles by drawing with a central core.

Briefly described, the concepts of this invention comprise the combination of steps of:

(1) Providing an assembly including—
  (a) A hollow billet of beryllium;
  (b) An external sheath of soft steel;
  (c) An internal sheath of soft steel;
  (d) A copper plate on one or the other or both of the sheaths;
(2) Drawing the assembly to effect the desired reduction of the composite, and
(3) Removing the copper plate and sheaths to free the drawn hollow beryllium product.

By the process of this invention, hollow articles of beryllium can be formed of constant internal diameter and with variable thicknesses by variation of the thickness of the external sheath while the draw ratio is held constant. Similarly, hollow articles of constant external diameter and with variable thickness can be formed by variation of the thickness of the internal sheath while the draw ratio is held constant.

Referring now to FIG. 1 of the drawing, illustration is made of a billet for use in the manufacture of tubes having a relatively large internal diameter, such as in excess of 10 mm.

The billet 10 is formed of consecutive layers, beginning from the outside, of a coating 8 of copper formed as by electrolytic platnig, a sheath 11 of soft steel, a ring 12 of beryllium, a thin internal sheath 13 of soft steel, and a coating 14 of copper formed as by electrolytic plating.

The sheath 11 is formed with a bore 11a dimensioned to have a cross-section corresponding to the cross-section of the ring 12 and a length slightly greater than the ring 12 so that the ring will be received in fitting relationship within the bore 11a of the sheath 11. To enable the ring 12 to be inserted into the bore of the sheath, the sheath is formed with a separable ring 11' adapted to have an internal diameter corresponding to that of the ring 12 so as to be received in fitting relationship over the end of the ring to secure the ring within the sheath in the assembled billet.

The cylinder 12 of beryllium can be formed by machining of a bar drawn of cast ingots or of a sintered billet or it can be formed by molding of powdered beryllium under heat and pressure, embodying the concepts of powdered metallurgy. It can also be machined directly from a block of beryllium formed by hot compression of beryllium powder in vacuo.

In carrying out the process of the invention, the billet 10 is preheated in an inert atmosphere, such as argon, to a temperature within the range of 850° to 1000° C. The billet is positioned on a drawing rod of high strength and heat resistant steel and which is heated to an elevated temperature and surface lubricated. The assembly is then housed in a container of a drawing press in which the container is heated to a temperature of about 450° C. and the billet is drawn through a die to effect the desired reduction.

The drawn assembly is treated with dilute nitric acid to attack the coating of copper and the sheaths of soft steel to leave the drawn tube of beryllium.

*Example 1*

By way of example, to produce beryllium tubes having an internal diameter of 13 mm. and an external diameter of 15.5 mm., use can be made of billets 10 of different dimension. In one instance, the billet can have an external diameter of 33.5 mm. and an internal diameter of 13.5 mm. and wherein use is made of a ring 12 of beryllium having an internal diameter of 14.5 mm. and an external diameter of 25 mm. In a second instance, the billet of the same dimension is used but the ring 12 is provided with the same internal diameter and an external diameter of 35 mm.

Use is made, in each instance, of a drawing rod having a diameter of 13 mm. and the container in which the billet is drawn has a diameter of 45 mm. The first assembly is drawn through a draw die having a die opening of 19 mm. thereby to provide for a reduction ratio of 10 to 1. The second assembly is drawn through a draw die having a die opening of 17 mm. to provide for a reduction ratio of 15 to 1.

The foregoing examples will illustrate the flexibility of the process whereby it becomes possible, by variation in the thickness of the external sheath 11, to vary the draw or reduction ratio to the end that tubes of specific dimensions can be obtained. In this manner, it becomes possible to limit the reduction ratio to a value compatible with the characteristics of the drawing rod to provide for satisfactory behavior.

It will be apparent that, in the drawing operation, the entire billet is subjected to reduction in cross-section relative to the inner rod or mandrel which remains constant whereby the beryllium in the ring 12 is carried with the sheaths 11 and 13 to the reduced dimension with corresponding elongation to form the desired tube but wherein the metal engaged by the draw die constitutes the soft steel sheath 11 with the copper coating formed as by electrolytic plating thereby to protect the die while working the beryllium to achieve the desired reduction ratio.

By the use of a sufficiently thin sheath 11 and properly shaped die, it is possible to produce tubes having radially extending longitudinal fins by direct drawing.

*Example 2*

This example is addressed to the production of tubes of beryllium having a relatively small internal diameter such as less than 10 mm.; however, tubes of larger diameter can be drawn by the process of Example 2. Such small or large diameter tubes can be drawn to provide smooth surfaces or with longitudinal fins in one or the other or both of the surfaces. When drawing to small diameters, the characteristics of the drawing rod become more critical.

The example will be described with reference to FIG. 2 in which the billet 20 is formed of an outer coating 19 of copper formed as by electrolytic plating; a thick sheath 21 of soft steel, a ring 12 of beryllium, and a core 23 of cupro-nickel alloy of steel containing 12% manganese.

The sheath 21 is again formed with a bore 21a having a cross-section corresponding to the cross-section of the ring 12 and a length greater than the ring 12 to enable the insertion of a locking ring 21 for holding the ring 12 in the bore of the sheath 21. The ring 12 of beryllium can be machined from a bar drawn from a cast ingot or a sintered billet, or it may be formed out of a block which has been produced by compression of beryllium powder under vacuum.

In practice, the billet 10 is preheated in an inert atmosphere, such as argon, to a temperature within the range of 850° to 1050° C. and it is placed in a draw container preheated to a temperature of about 450° C. and the assembly is advanced through a draw die to effect reduction in cross-section of the billet.

Core removal can be achieved by machining the ends of the drawn billet to release the core to enable it to be pulled from the assembly. The outer sheath and copper coating can be attacked by dilute nitric acid for removal to separate the drawn beryllium tube.

By way of illustration, in the production of a tube having an external diameter of 5 mm. and an internal diameter of 2 mm., use can be made of a billet 20 having an external diameter of 43.5 mm. and a ring of beryllium having an external diameter of 20 mm. and an internal diameter of 8 mm. The container of the draw press in which the billet is placed has a diameter of 45 mm. before drawing and a diameter of 11 mm. after being processed through the draw die which corresponds to a reduction ratio of about 16 to 1.

The described technique is applicable to the production of tubes with internal or external longitudinal fins. For such purpose, it is sufficient to make use of a billet with a beryllium core of a homothetic section in a given ratio with respect to the tube to be drawn, followed by drawing to reduce the billet so as to reduce its section in the same ratio.

It will be obvious that during advancement of the billet through the die reduction in cross-section will occur to all of the elements making up the billet thereby to work the beryllium within the protective confines of the internal core and external sheath to permit large reductions to be taken without breakage of the draw die and without introduction of roughness or cracks in the surface of the drawn beryllium tube.

It will be apparent that drawn or extruded products of shapes other than cylindrical or tubular can be produced.

The copper coating may be deposited electrolytically of copper other than electrolytic.

It will be understood that the invention relates not only to the process steps and assembly of the billet but to the drawn or extruded beryllium tube as well.

It will be understood that changes may be made in the details of construction, arrangement and operation, without departing from the spirit of the invention, especially as defined in the following claims.

We claim:
1. For use in the method of processing beryllium to produce hollow articles by drawing or extrusion, a billet comprising in cross-section, from the outside in, a thin layer of copper, a relatively thick external sheath of soft steel, a hollow cylinder of beryllium, an internal sheath of soft steel, and a thin layer of copper.

2. A billet as claimed in claim 1 in which the layers of copper are formed on the sheath by electrolytic plating.

3. A billet as claimed in claim 1 in which the external sheath is formed with a bore dimensioned to have a cross-section corresponding to the cross-section of the cylinder of beryllium and a length greater than the length of the cylinder or beryllium to receive the cylinder of beryllium therein.

4. A billet as claimed in claim 3 which includes a locking ring forming a part of the sheath and fitting into the bore of the sheath over the end of the cylinder to lock the cylinder in the sheath.

5. A billet as claimed in claim 1 in which the cylinder of beryllium is formed by one of the processes of machining a drawn bar of beryllium, machining a sintered billet of beryllium, and a part formed by hot compresison of beryllium powders.

6. For use in the method of processing beryllium to produce hollow articles by drawing or extrusion, a billet comprising in cross-section, from the outside in, a thin layer of copper, an external sheath of soft steel, a hollow cylinder of beryllium and an internal core of relatively hard steel.

7. A billet as claimed in claim 6 in which the layer of copper is deposited by electrolytic plating.

8. A billet as claimed in claim 6 in which the external sheath is formed with a bore dimensioned to have a cross-section corresponding to the cross-section of the cylinder of beryllium and a length greater than the length of the cylinder to receive the cylinder of beryllium therein.

9. A billet as claimed in claim 8 which includes a locking ring fitting into the bore of the sheath over the end of the cylinder to lock the cylinder in the sheath.

10. A billet as claimed in claim 6 in which the cylinder of beryllium is formed by one of the processes of hot compression of beryllium powders, machining a drawn bar of beryllium and machining a sintered billet of beryllium.

11. In the method of processing beryllium to produce hollow articles by drawing or extrusion comprising providing a billet formed in cross-section, from the outside in, of a thin layer of copper, a relatively thick external sheath of soft steel, a hollow cylinder of beryllium, an internal sheath of soft steel and a thin layer of copper, advancing the billet through a die to effect a reduction in cross-sectional area with corresponding reduction of the enclosed beryllium cylinder, attacking the copper coatings and steel sheaths to release the drawn beryllium part.

12. The method as claimed in claim 11 in which, when the internal sheath is hollow, a draw rod is inserted in the bore of the sheath prior to drawing whereby drawing takes place over the rod.

13. The method as claimed in claim 11 in which the billet is preheated prior to drawing to a temperature within the range of 850° to 1050° C.

14. The method as claimed in claim 11 wherein variation in the thickness of the external sheath results in corresponding variation in the thickness of the drawn beryllium product while the internal diameter remains relatively constant.

15. The method as claimed in claim 11 wherein variation in the thickness of the internal sheath results in corresponding variation in the thickness of the drawn beryllium product while the external diameter is held relatively constant.

16. In the method of processing beryllium to produce hollow articles by drawing or extrusion comprising providing a billet comprising in cross-section, from the outside in, a thin layer of copper, an external sheath of soft steel, a hollow cylinder of beryllium, and an internal core of relatively hard steel, advancing the billet through a die to effect reduction in cross-sectional area with corresponding reduction of the enclosed beryllium cylinder, machining the ends to release the core, removing the core and attacking the copper coating and steel to release the drawn beryllium part.

17. The method as claimed in claim 16 in which the billet is preheated to a temperature within the range of 850° to 1050° C. prior to drawing.

18. The method as claimed in claim 16 wherein variation in the thickness of the external sheath results in corresponding variation in the thickness of the drawn beryllium product while the internal diameter remains relatively constant.

19. The method as claimed in claim 11 wherein the drawn beryllium tube is formed with longitudinal fins on one of the surfaces including the internal and external surface which includes the step of machining the billet with a beryllium core of homothetic section in a given ratio to that of the tube to be formed, and drawing the billet for reduction in cross-section in the same proportion.

References Cited by the Examiner
UNITED STATES PATENTS

| | | | |
|---|---|---|---|
| 2,872,363 | 2/1959 | Macherey | 72—700 |
| 3,131,804 | 5/1964 | Guest | 72—367 |
| 3,150,936 | 9/1964 | Hunt | 29—187.5 |

WILLIAM W. DYER, JR., *Primary Examiner.*

G. A. DOST, *Assistant Examiner.*